Figure 1:
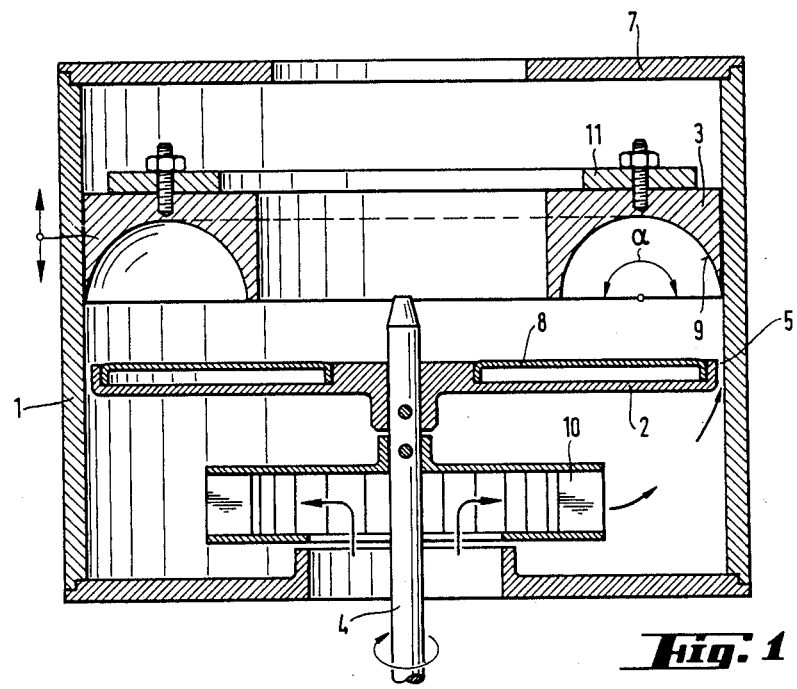

United States Patent [19]

Christen

[11] Patent Number: 4,946,359
[45] Date of Patent: Aug. 7, 1990

[54] APPARATUS FOR MAKING SPHERICAL GRANULES

[75] Inventor: Daniel Christen, Riehen, Switzerland

[73] Assignee: Ciba-Geigy Corporation, Ardsley, N.Y.

[21] Appl. No.: 410,188

[22] Filed: Sep. 20, 1989

[30] Foreign Application Priority Data

Sep. 22, 1988 [CH] Switzerland .................. 3524/88

[51] Int. Cl.$^5$ .................. B29C 43/08; A21C 11/00
[52] U.S. Cl. .................. 425/222; 55/341.3; 118/303; 264/15; 366/69; 425/333
[58] Field of Search ............ 425/112, 222, 332, 333; 264/15; 366/54, 93, 187, 222, 232, 98, 99, 69; 55/341.3; 427/213; 118/303

[56] References Cited

U.S. PATENT DOCUMENTS

| | | | |
|---|---|---|---|
| 337,342 | 3/1886 | Kutzner | 425/332 |
| 687,199 | 11/1901 | Colton | 425/333 |
| 1,094,966 | 4/1914 | Barker | 425/333 |
| 3,713,187 | 1/1973 | Quartarone et al. | 425/333 |
| 4,588,366 | 5/1986 | Glatt | 55/341.3 |
| 4,740,390 | 4/1988 | Kulling | 118/303 |

FOREIGN PATENT DOCUMENTS

| | | | |
|---|---|---|---|
| 21687 | 10/1905 | Austria | 425/332 |
| 210335 | 12/1906 | Fed. Rep. of Germany | 366/54 |
| 3523990 | 2/1986 | Fed. Rep. of Germany | . |
| 2062098 | 6/1971 | France | 425/333 |

OTHER PUBLICATIONS

Aeromatic-NICA System-Spheroniser.
Rowe, Pharmacy International 119–123 (May 1985).

Primary Examiner—Willard Hoag
Attorney, Agent, or Firm—Harry Falber

[57] ABSTRACT

The apparatus comprises a fixed cylindrical housing and a centrifugal disc closing the housing in the manner of a base, which disc is rigidly connected to a motor driven shaft. Above the centrifugal disc a ring is fitted into the housing. The distance of that ring from the centrifugal disc is such that material propelled outwards by the centrifugal disc and upwards at the wall of the housing is positively deflected at the lower curved surface of the ring.

18 Claims, 3 Drawing Sheets

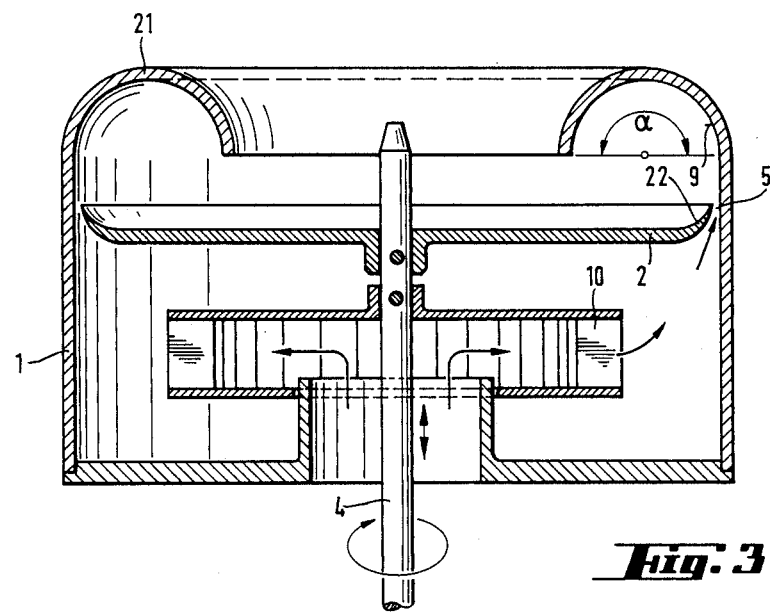
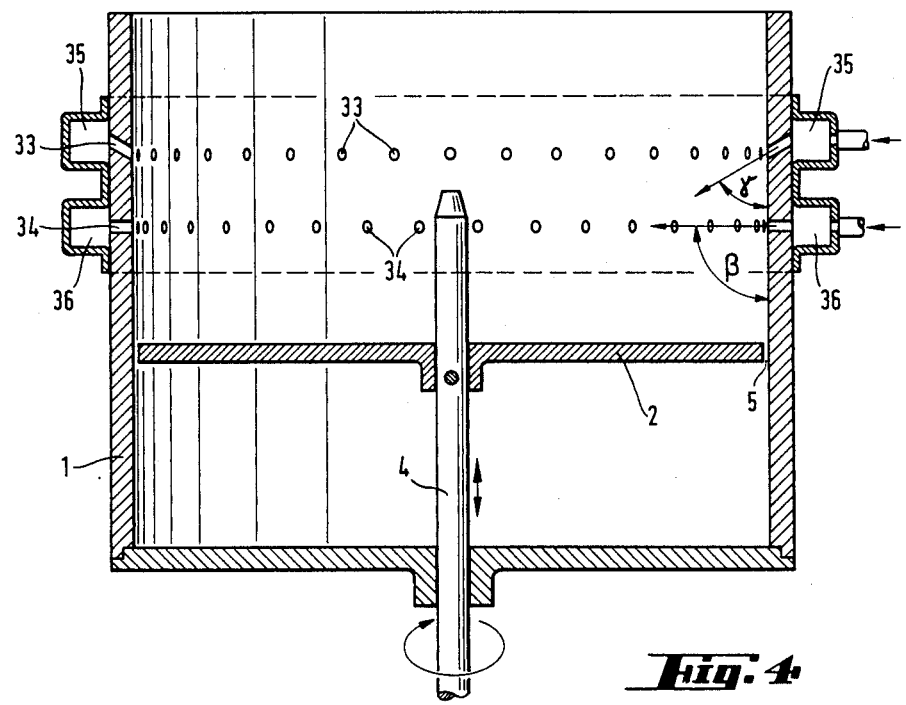

APPARATUS FOR MAKING SPHERICAL GRANULES

The invention relates to an apparatus for making spherical granules from a material in the form of powder, cylindrical or unshaped granules or strand-form extrusions, comprising: a fixed, rotationally symmetrical housing, a drive shaft arranged vertically within the housing, a centrifugal disc mounted for rotation on the drive shaft and extending transversely across the housing in the manner of a base. Such apparatus are also known as granulators or pelletizers.

Medicaments in the form of small spheres (pellets) have a number of advantages. The spherical shape has the smallest possible surface-to-volume ratio and is therefore well tolerated by the patient. The particularly good flow properties of the pellets allow simple mixing of different pellets in capsules from which the active ingredients are later released into the body. For this reason spherical granules are used widely in the preparation of medicaments.

In apparatus of the kind according to the invention either powder is agglomerated to form the desired spherical granules or pieces that are larger than the desired spherical granules, for example a strand-form extrusion or cylindrical granules, are first divided into particles of approximately equal size and are then rounded to form pellets. When extruded strands are processed, the diameter of the finished pellets is approximately the same as the diameter of the extruded strand (from 0.8 to 1.2 mm).

U.S. Pat. No. Re. 27,214 describes a granulator in which the material to be pelleted (powder, extrusion etc.) is propelled outwards by a rotating plate under the action of centrifugal force and upwards at the wall of the housing. From above the particles fall back down again by gravity onto the plate where they are once more accelerated centrifugally, and so on. In all, during the processing operation the material to be pelleted follows an approximately helical path along the wall of the housing, with collisions and friction bringing about the spherical shape. The granulators model 15 and model 27 by G. B. Caleva Ltd., Newcastle, England, also operate according to this principle.

U.S. Pat. No. 4,588,366 describes a two-part granulator. It comprises an agglomeration chamber with a filter part arranged above it. Inside the chamber there is arranged a rotary table of adjustable height. The adjustable height of the rotary table together with the conical shape of the chamber casing allows the width of the annular gap between the casing and the table to be adjusted. Air is passed upwards into the chamber through this annular gap. As a result of this air current and the rotation of the table, the powder, which is sprayed in at the side above the table, is caused to perform a kind of rotary movement. The intermixing of the built-up granules that are formed is not very good, however, as some of the granules tend to "float" on the lower layers. In addition, a great deal of dust is formed, for which reason the filter part arranged above the agglomeration chamber is essential.

EP-A-No. 0 228 633 describes a two-chamber granulator. From a central processing chamber the powder lying on a rotating disc passes under the action of centrifugal force into an annular outer chamber. Air for drying and propelling purposes is passed into this annular chamber from below. In this manner the powder in the annular chamber is dried and can be returned to the central processing chamber. For the purpose of agglomeration the powder can be moistened inside the central processing chamber by means of nozzles. The intermixing of the built-up granules formed is not very good. In this granulator too, some of the granules tend to "float" on the lower layers. A great deal of dust is produced. For this reason a filter system must be provided above the central treatment chamber.

DE-A-No. 3 523 990 describes a so-called fluidised-bed apparatus. This apparatus comprises an approximately spherical container having an annular channel and an annular gap in the lower region. In operation, air is passed from below into the container and is then diverted outwards and downwards by a deflecting screen arranged in the upper region, so that a toroidal eddy is produced. In addition, air is passed obliquely upwards through the annular gap, the air forming a lower air cushion. A liquid or solid mixture sprayed in is treated between the upper air eddy and the lower air cushion. This fluidised-bed apparatus is very suitable for coating granules or for applying active ingredient, but it is less suitable for the agglomeration of powders because of the large amount of dust produced.

The object of the pelleting process is to produce solid uniform pellets that as far as possible all have the same diameter. The achievement of this object is difficult since it depends on a large number of sometimes conflicting factors. At the outset the formulation and thus the nature of the starting material is a problem. Strand-form extrusion should have just the right consistency so that, on the one hand, it breaks up in the granulator but, on the other hand, it does not disintegrate into pieces that are too small. The extrusion should also not be sticky, otherwise pieces will stick together or will remain adhering to the housing. Similarly, pulverulent material should agglomerate to form pellets but, at the same time, the pellets should not adhere to one another, for which reason liquid binders are mixed with the powder.

The granulators known hitherto have provided only a partial solution to the problem. This is also true of the granulator described in a brochure PR 85.3 of Aeromatic Inc. Towaco, N.J., U.S.A. in which the centrifugal disc has an oblique edge at its rim so that the transition to the wall of the housing takes place at an angle of approximately 45°. The improvement achieved thereby is, however, inadequate.

The invention is intended to overcome the described shortcomings of the prior art by providing a granulator which produces spherical shapes that are as exact as possible and that have as small a variation in diameter as possible, while at the same time the demands made of the starting material are reduced.

By the invention as set forth in claim 1 all these problems are solved. The dependent claims are directed to features of preferred embodiments of the invention.

The effect of the deflecting means according to the invention, by means of which the material propelled upwards at the wall of the housing is positively deflected inwardly and/or downwardly before it has reached its "natural" upper turning point, may be attributed especially to the fact that there is thereby prevented a situation in which a portion of the material to be treated "floats" in the region of the upper turning point and is periodically removed from circulation. In comparison with the known prior art, this achieves a vast improvement in almost all parameters.

The invention will be described in detail below with reference to four illustrative embodiments shown in the drawings:

FIGS. 1 to 4 show the four embodiments, each in axial section, and FIGS. 5a to 5d are graphs to illustrate the mode of action.

A feature common to all four embodiments is a cylindrical housing 1 in which a circular disc 2 is horizontally and centrically arranged. The disc 2 is rigidly connected to a central drive shaft 4 which is coupled via a gear mechanism to a drive motor (not shown).

Figure 2:
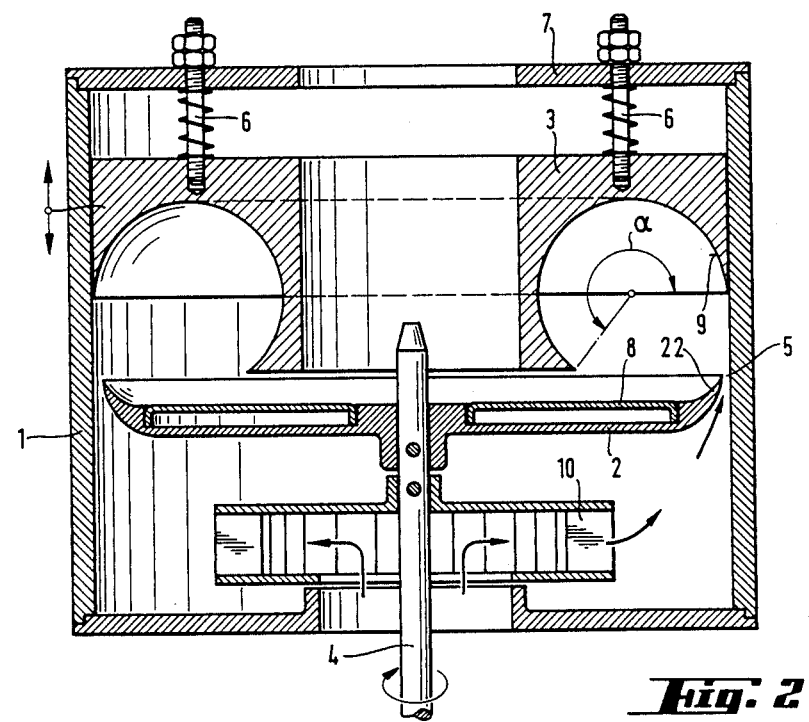

The four embodiments differ especially in the different forms of the deflecting means which are arranged above the centrifugal disc 2 and spaced apart therefrom. In the embodiments of FIG. 1 and FIG. 2 these deflecting means are (in each case) formed by an annular shaped part 3. In FIG. 1 this part is so arranged in the housing that it can move freely in the vertical direction with little friction. In FIG. 2 the shaped part 3 is suspended by means of vertical bolts 6 from the lid 7 of the housing in such a manner that its height can be adjusted. In FIG. 3 the deflecting means are formed by the inwardly curved upper rim region 21 of the housing 1 and in FIG. 4 they are formed by two parallel rings of nozzles 33 and 34.

The curved deflecting surface in the embodiments of FIG. 1 to FIG. 3 is in cross-section curved concavely over the centrifugal disc 2. Preferably this curve is arcuate in cross-section (constant radius of curvature), the angle of curvature α being approximately 180° (FIG. 1 and FIG. 3) or 230° (FIG. 2). The expression "angle of curvature" α denotes that angle which is enclosed by the normal to the tangent of the curve at the beginning of the curve with that at the end of the curve. When the curvature is constant (arc of a circle) this angle is designated the sector angle.

Other embodiments of the invention also provide deflecting surfaces 9 having cross-sections of varying radius of curvature. The essential factor is that the material to be pelleted is diverted back into the interior of the housing and onto the centrifugal disc 2 again. When there is a continuous transition between the housing and the deflecting surface 9 (angle 0°), the angle of curvature α is therefore preferably greater than 90°. When the transition is not continuous, it is necessary to subtract from that angle the angle at which the curved surface 9 leaves the wall of the housing, so that in its end region the curved surface in turn encloses the same angle with the horizontal. The angle of curvature α selected should not, however, be too large, since otherwise the deflecting surface 9 will direct the material onto the centrifugal disc 2 too far towards the outside. An angle of curvature of approximately 240° is still suitable. In this case too, when the transition to the housing 1 is not continuous, it is necessary to subtract the angle at which the deflecting surface leaves the wall of the housing.

In the embodiments shown in FIG. 1 to FIG. 3 the transition from the housing wall to the curved annular deflecting surface 9 is continuous (angle 0°). When the transition is not continuous the "transition angle" should not be too large (70° maximum).

The deflecting surface of the shaped part 3 or of the upper rim region 21 of the curved housing is generally smooth. It is also possible, however, for all or part of the surface to be profiled or to be rough. In that case, the particles to be pelleted lose energy more rapidly as a result of the increased friction and collision stress and fall back onto the centrifugal disc 2 at an earlier stage.

The size of the shaped part 3 or its cross-section is dependent upon the amount of material to be pelleted. Altogether, the volume of the ring in which the helical winding movement develops must allow free movement of the material to be pelleted. The deflecting surface 9 of the shaped part 3 or of the inwardly curved rim 21 of the housing preferably extends over from 50% to 90% of the cross-section of the housing.

In order that a suitable winding movement can develop, the distance between the shaped part 3 and the centrifugal disc 2 should be so adjusted that the material propelled upwards at the wall of the housing is positively deflected inwards and downwards again before it reaches its "natural" upper turning point but, on the other hand, the distance should not be so small that the circulation period of the particles is too short or that the execution of the winding movement is adversely affected. In order to regulate the distance, either the height of the shaped part 3 in the housing is adjusted (FIG. 2) or the height of the centrifugal disc 2 is altered. In the pelletizers according to FIG. 3 and FIG. 4 this distance can be adjusted only by altering the height of the centrifugal disc 2 (by means not shown).

In the embodiment of FIG. 1, the weight of the shaped part 3 is utilised for regulating the distance. In this apparatus the shaped part is guided with little friction in the housing. During the pelleting operation the shaped part 3 floats on the material. Its distance from the centrifugal disc is adjusted automatically in dependence upon the amount of material, the speed of the centrifugal disc 2 and the weight of the shaped part 3. The distance can also be varied by means of weights, for example in the form of rings 11 that can be placed on the shaped part 3.

The surface of the centrifugal disc 2 preferably has a groove/rib shoulder or the like. Such surfaces, as described, for example, in Pharmacy International, May 1985, pages 119–123, produce good rounding effects. Such a structural pattern can be provided either on the centrifugal disc 2 itself or on a corresponding insert 8.

In the embodiments of FIG. 1 and FIG. 4 the centrifugal disc 2 is planar up to its rim. In the embodiments according to FIG. 2 and FIG. 3 the rim region 22 is bent upwards at an angle of curvature of approximately 60°.

In the apparatus according to FIGS. 1 to 3 a fan 10 is arranged below the centrifugal disc. The fan blows air through the gap 5 between the wall of the housing and the centrifugal disc 2 and on the one hand assists the helical winding movement of the material and, on the other hand, prevents the material from settling in the gap 5. The fan 10 is necessary in the case where powder is to be agglomerated to form spherical granules.

A different kind of deflecting means is used in the apparatus according to FIG. 4. Air is blown into the interior of the housing through rings of nozzles 33 and 34 having compressed air supply lines 35 and 36 and forms a curtain of air which deflects the material inwards. In this case the deflecting action is dependent upon the air pressure and upon the direction (angle $\beta$, $\gamma$) in which the nozzles blow air onto the material. When compressed air nozzles are used as deflecting means, attention should be paid to the required relative humidity. The process of pelleting an extrusion requires a relative humidity higher than that required for making pellets from powder. In the first case, drying-out must be prevented, whereas in the second case drying is desirable.

As already mentioned, the material performs a kind of helical winding movement. This movement therefore has a component in the circumferential direction. In certain cases it is therefore possible to dispense with an annular deflecting part and to use a substantially shovel- or plough-shaped baffle. This, of course, presents a downwardly directed deflecting surface to the circumferential component and extends over only one sector in the circumferential direction. The upper edge of this surface must be arranged at a point in the housing higher than the natural turning point of the material. Analogously thereto, in the embodiment having nozzles, only one nozzle or a small number of nozzles would be sufficient to guide the material in the direction of the housing axis.

Comparison tests using a pelletizer according to FIG. 1 were carried out using the following two chemical formulations:

| | | |
|---|---|---|
| 1. tricalcium phosphate | 50% | |
| microcrystalline cellulose | 50% | |
| water | 100% | of the dry mass |
| 2. ground lactose | 50% | |
| microcrystalline cellulose | 50% | |
| water | 60% | of the dry mass |

The formulations were processed to form two strand-form extrusions; two tests were then performed on each extrusion.

Test 1: pelleting the extrusions in an apparatus according to FIG. 1 without the shaped part 3.

Test 2: pelleting the extrusions in the same apparatus with the shaped part 3 inserted at a fixed height.

Figures 5A, 5B:
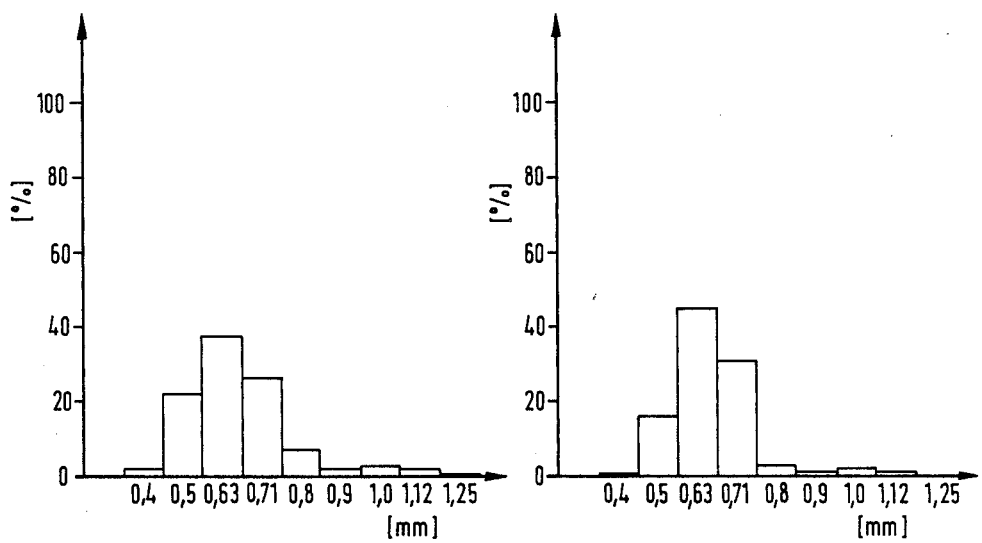
Figures 5C, 5D:
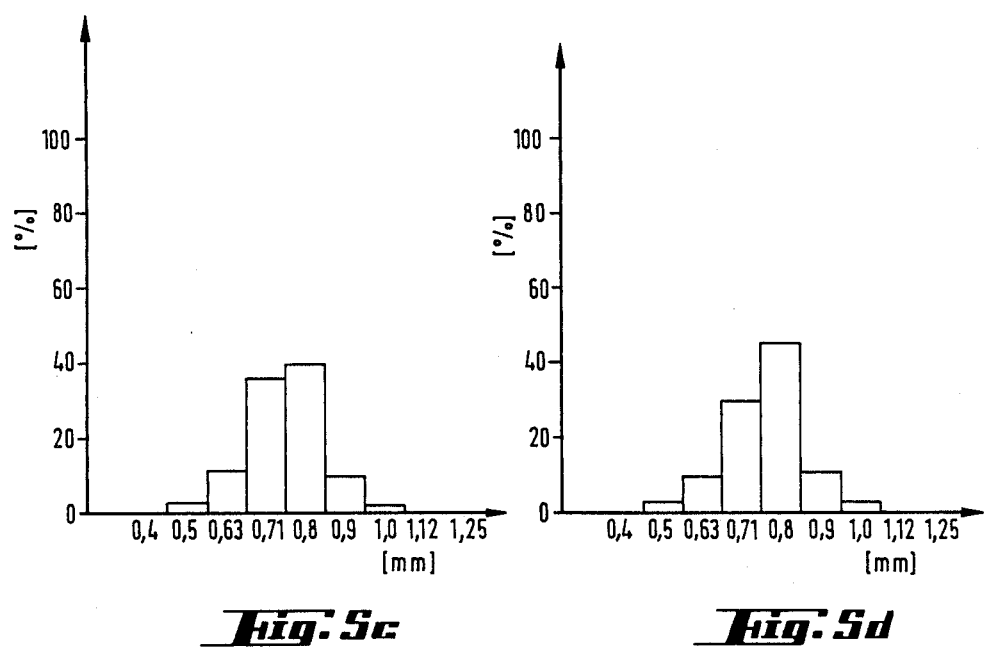

After the tests, the distribution of the pellet diameters was determined and plotted on the graphs of FIG. 5a to FIG. 5d. FIG. 5a shows the result of test 1 with formulation 1, FIG. 5c shows the result with formulation 2. FIG. 5b shows the result of test 2 with formulation 1 and 5d with formulation 2. In FIG. 5b and FIG. 5d the low degree of scattering of the pellet diameters around the value 0.63 mm and 0.8 mm can be seen clearly.

What is claimed is:

1. An apparatus for making spherical granules from a material in the form of powder, cylindrical or unshaped granules or strand-form extrusions, comprising: a fixed, rotationally symmetrical housing, a drive shaft arranged vertically within the housing, a centrifugal disc mounted for rotation on the drive shaft and extending transversely across the housing in the manner of a base, and deflecting ring member arranged above the centrifugal disc and spaced apart therefrom, such that material propelled outwards by the centrifugal disc and upwards at the wall of the housing is positively deflected inwardly and downwardly.

2. An apparatus according to claim 1, wherein the distance between the deflecting member and the centrifugal disc can be adjusted as desired.

3. An apparatus according to claim 1, wherein the deflecting member comprises a horizontal annular deflecting surface which adjoins the wall of the housing and which is upwardly curved in cross-section.

4. An apparatus according to claim 3, wherein the transition between the wall of the housing and the said deflecting surface is substantially continuous.

5. An apparatus according to claim 3, wherein the angle of curvature ($\alpha$) of the said deflecting surface is from 90° to 240°.

6. An apparatus according to claim 5, wherein the said angle of curvature ($\alpha$) is approximately 180°.

7. An apparatus according to claim 5, wherein the said angle of curvature ($\alpha$) is approximately 230°.

8. An apparatus according to claim 3, wherein the said deflecting surface extends over approximately from 50% to 90% of the cross-section of the housing.

9. An apparatus according to claim 3, which wherein said ring is fitted into the said housing and wherein the said deflecting surface is formed by the underside of the said ring.

10. An apparatus according to claim 3, wherein the upper rim of the wall of the housing is inwardly curved so as to form the said deflecting surface.

11. An apparatus according to claim 3, which includes a ring fitted into the housing with the said deflecting surface formed by the underside of the said ring, and wherein the housing has a lid from which the said ring is suspended in such a manner that its height can be adjusted.

12. An apparatus according to claim 3, wherein the said deflecting surface is smooth.

13. An apparatus according to claim 3, wherein the said deflecting surface is rough or has grooves or flutes.

14. An apparatus according to claim 1, wherein the deflecting ring member contains at least one compressed air nozzle.

15. An apparatus according to claim 1, wherein the deflecting member comprises at least one circumferentially extending array of compressed air nozzles.

16. An apparatus according to claim 9, wherein the housing is cylindrical and the ring is so arranged in the housing that it can move freely in the vertical direction with little friction, the weight of the ring being such that it can float on, and can be supported by, the material propelled upwards at the wall of the housing.

17. An apparatus according to claim 16, which includes at least one additional weight for adjusting the total weight of the ring.

18. An apparatus according to claim 1, wherein the outer region of the centrifugal disc is bent upwards at an angle.

* * * * *